(12) United States Patent
Liu et al.

(10) Patent No.: US 9,836,159 B2
(45) Date of Patent: Dec. 5, 2017

(54) TOUCH DISPLAY PANEL AND METHOD FOR DRIVING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Hailin Xue, Beijing (CN); Cheng Li, Beijing (CN); Haisheng Wang, Beijing (CN); Fuqiang Li, Beijing (CN); Xiaoliang Ding, Beijing (CN); Wei Liu, Beijing (CN); Jun Fan, Beijing (CN)

(73) Assignees: BOE-TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 1 day.

(21) Appl. No.: 15/159,348

(22) Filed: May 19, 2016

(65) Prior Publication Data

US 2017/0010737 A1    Jan. 12, 2017

(30) Foreign Application Priority Data

Jul. 8, 2015    (CN) .......................... 2015 1 0397580

(51) Int. Cl.
*G06F 3/041*    (2006.01)
*G02F 1/1343*    (2006.01)
(Continued)

(52) U.S. Cl.
CPC ........ *G06F 3/0416* (2013.01); *G02F 1/13338* (2013.01); *G02F 1/133512* (2013.01);
(Continued)

(58) Field of Classification Search
CPC ................ G06F 3/0412; G06F 3/0416; G06F 2203/04111; G02F 1/134309; G02F 1/133514; G02F 1/133512; G02F 1/13338
See application file for complete search history.

(56) References Cited

U.S. PATENT DOCUMENTS

2013/0141343 A1* 6/2013 Yu ........................... G06F 3/044
                                                            345/173
2014/0362031 A1* 12/2014 Mo .......................... G09G 3/36
                                                            345/174
2016/0041664 A1    2/2016 Qin et al.

FOREIGN PATENT DOCUMENTS

CN    203149548 U    8/2013
CN    203178995 U    9/2013
(Continued)

OTHER PUBLICATIONS

First Office Action dated Jul. 3, 2017 in corresponding Chinese Patent Application No. 201510397580.7.

*Primary Examiner* — Abbas Abdulselam
(74) *Attorney, Agent, or Firm* — Nath, Goldberg & Meyer; Joshua B. Goldberg

(57) ABSTRACT

The present disclosure provides a touch display panel and a driving method thereof The touch display panel includes a common electrode layer including a first common electrode and a second common electrode spaced apart from each other, the touch display panel further comprises a touch signal source, a switch layer and a common wire, each display cycle of the touch display panel comprises a display stage and a touch stage, the touch signal source can provide a touch signal to the first common electrode in the touch stage, the common wire is connected to a common voltage output terminal, the second common electrode is electrically connected to the common wire, and the switch layer comprises a first switch element for electrically connecting the
(Continued)

first common electrode with the common wire in the display stage, and disconnecting the first common electrode from the common wire in the touch stage.

20 Claims, 2 Drawing Sheets

(51) Int. Cl.
  *G02F 1/1333* (2006.01)
  *G02F 1/1335* (2006.01)
  *G06F 3/044* (2006.01)

(52) U.S. Cl.
  CPC .. *G02F 1/133514* (2013.01); *G02F 1/134309* (2013.01); *G06F 3/044* (2013.01); *G06F 3/0412* (2013.01); *G06F 2203/04111* (2013.01)

(56) References Cited

FOREIGN PATENT DOCUMENTS

| | | | |
|---|---|---|---|
| CN | 104166489 A | 11/2014 |
| CN | 104598080 A | 5/2015 |
| CN | 104598089 A | 5/2015 |

\* cited by examiner

TOUCH DISPLAY PANEL AND METHOD FOR DRIVING THE SAME

FIELD OF THE INVENTION

The present invention relates to a display panel, and particularly to a touch display panel and a method for driving the touch display panel.

BACKGROUND OF THE INVENTION

Embedded touch display panel, which includes touch driving electrodes and touch sensing electrodes embedded therein, is a common touch display panel at present.

In order to simplify the structure of the embedded touch display panel, a part of common electrodes in the touch display panel may also serve as the touch driving electrodes. Accordingly, one display cycle of the touch display panel includes a display stage, in which a common voltage signal is provided to each common electrode, and a touch stage, in which a touch driving signal is provided to the common electrodes serving as the touch driving electrodes.

The common electrodes serving as the touch driving electrodes are connected in series via touch driving electrode connecting lines, and the rest of the common electrodes are connected in series via common electrode lines. In the display stage, the common voltage signals are provided to the common electrodes serving as the touch driving electrodes via the touch driving electrode connecting lines. Because the connection between the touch driving electrode connecting line and a signal source is different from that between the common electrode line and the signal source, resistance-capacitance (RC) loading of the common electrodes serving as the touch driving electrodes is different from that of the remaining common electrodes in the display stage, which causes images displayed in the display stage to be non-uniform.

Therefore, it has become an urgent technical problem to be solved in the art how to avoid the problem that images displayed in the display stage are non-uniform in the case where a part of the common electrodes in the touch display panel also serve as the touch driving electrodes.

SUMMARY OF THE INVENTION

An object of the present disclosure is to provide a touch display panel and a method for driving the touch display panel. In the display stage, the touch display panel can display uniform images.

In order to achieve the above object, embodiments of the present invention provide a touch display panel including a common electrode layer, which includes a first common electrode and a second common electrode spaced apart from each other, the touch display panel further includes a touch signal source, each display cycle of the touch display panel includes a display stage and a touch stage, the touch signal source is capable of providing a touch signal to the first common electrode in the touch stage, the touch display panel further comprises a switch layer and a common wire, the common wire is connected to a common voltage output terminal, the second common electrode is electrically connected to the common wire, and the switch layer comprises a first switch element, which is used for electrically connecting the first common electrode with the common wire in the display stage and disconnecting the first common electrode from the common wire in the touch stage.

Optionally, the common wire is arranged in the common electrode layer, and the common wire and the first common electrode are made of the same material.

Optionally, the common wire and the first switch element are both arranged in a non-display region of the touch display panel.

Optionally, the touch display panel further includes a second switch element, which is used for disconnecting the first common electrode from the touch signal source in the display stage and electrically connecting the first common electrode with the touch signal source in the touch stage.

Optionally, the second switch element is arranged in the switch layer, and is formed at the same time When forming the first switch element.

Optionally, the touch display panel includes a plurality of rows of first common electrodes and a plurality of rows of second common electrodes, and the plurality of rows of first common electrodes and the plurality of rows of second common electrodes are arranged alternately in a column direction.

Optionally, each row of first common electrode includes a plurality of first common electrode blocks, the touch display panel further includes a plurality of first leads, each of which corresponds to at least one column of first common electrode blocks and is used for connecting the first common electrode blocks corresponding thereto in series, a first end of the first lead is connected to the common wire via the first switch element, a second end of the first lead is connected to an output terminal of the touch signal source, and one first switch element is used for controlling connection between at least one first lead and the common wire.

Optionally, the first leads and the common electrode layer are arranged in different layers, and each first lead is electrically connected to the first common electrode blocks corresponding thereto through first via holes.

Optionally, the touch display panel further includes a second lead used for connecting the second common electrodes in different rows in series.

Optionally, the second lead is electrically connected to the common wire, the first lead and the second lead are arranged in the same layer, the second lead and the common electrode layer are arranged in different layers, and the second lead is electrically connected to the common wire and the second common electrodes through a plurality of second via holes, respectively.

Optionally, a first switch element is provided between the second lead and the common wire, and is used for electrically connecting the second common electrodes with the common wire in the display stage and disconnecting the second common electrodes from the common wire in the touch stage.

Optionally, the touch signal source includes a touch driving signal source, which is connected to the first lead via a second switch dement, and a touch sensing signal source, which is connected to the second lead via a third switch element.

Optionally, the first leads and data lines of the touch display panel are arranged in the same layer.

Optionally, the touch display panel further includes a plurality of sets of connecting portions arranged in the same layer as the first leads, each set of connecting portions includes a vertical connecting portion and a horizontal connecting portion, a first end of the vertical connecting portion is connected with the horizontal connecting portion, a second end of the vertical connecting portion is electrically connected with the common wire, the first switch element is arranged on the vertical connecting portion, the horizontal connecting portion is connected with the first ends of two or more first leads, and different first leads correspond to different columns of pixel units.

Optionally, the first switch element is a transmission gate including a NMOS tube and a PMOS tube, and the touch display panel further includes control gate lines, which are connected to gates of the NMOS tube and the PMOS tube so that control signals for controlling on and off states of the first switch element are provided via the control gate lines.

Optionally, the second common electrode is strip-shaped or block-shaped.

Optionally, the touch display panel further includes a touch sensing electrode spaced apart and insulated from the common electrode layer, the touch signal source includes a touch driving signal source, which is connected to the first common electrode, and a touch sensing signal source, which is connected to the touch sensing electrode.

Optionally, the touch display panel includes an array substrate, a color filter substrate and a liquid crystal layer arranged between the array substrate and the color filter substrate, the common electrode layer is arranged on the array substrate, the touch sensing electrode is arranged on the color filter substrate, a black matrix is arranged on the color filter substrate, and the touch sensing electrode is overlapped with the black matrix.

As another aspect of the present disclosure, there is provided a method for driving the above touch display panel, wherein, the method includes steps of:

controlling the first switch element to be turned on to electrically connect the first common electrode with the common wire, in the display stage; and controlling the first switch element to be turned off to disconnect the first common electrode from the common wire, in the touch stage.

Optionally, in the case where the touch display panel further includes the second switch element, the method further includes steps of:

controlling the second switch element to be turned off to disconnect the first common electrode from the touch signal source, in the display stage; and controlling the second switch element to be turned on to electrically connect the first common electrode with the touch signal source, in the touch stage.

In the display stage of the touch display panel according to the present disclosure, the first common electrode is connected with the common voltage output terminal via the common wire, rather than via a touch driving circuit as in the prior art, so the RC loading produced when connecting the first common electrode and the common voltage output terminal is close to that produced when connecting the second common electrode and the common voltage output terminal according to the present disclosure. It can thus be seen that more uniform display effect can be obtained when the touch display panel according to the present disclosure is used to display images.

BRIEF DESCRIPTION OF THE DRAWINGS

The accompanying drawings, which serve to provide a further understanding of the present disclosure and constitute a part of this specification, are used for explaining the present disclosure together with the following specific implementations, rather than limiting the present disclosure. In the drawings.

Figure 1:
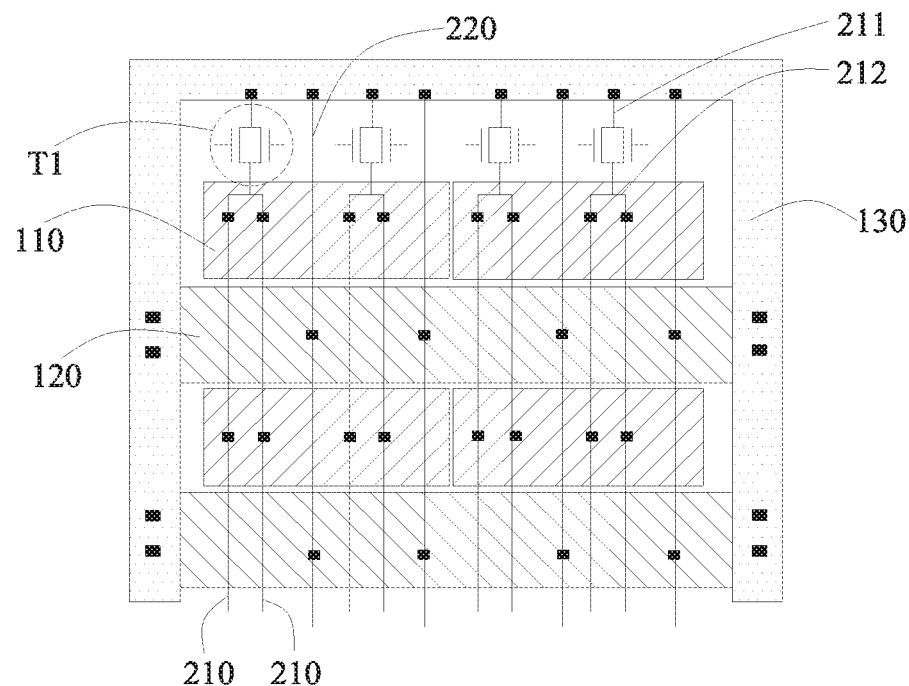
FIG. 1 is a schematic diagram of a common electrode layer in a first implementation of a touch display panel according to an embodiment of the present invention.

| Reference numerals: | |
|---|---|
| 110: first common electrode | 120: second common electrode |
| 130: common wire | 210: first lead |
| 220: second lead | T1: first switch element |
| 211: vertical connecting portion | 212: horizontal connecting portion |

DETAILED DESCRIPTION OF THE EMBODIMENTS

Specific implementations of the present disclosure will be described in detail below in conjunction with the accompanying drawings. It should be understood that, the specific implementations described herein are merely used for explaining and describing the present disclosure, rather than limiting the present disclosure.

Figure 2:
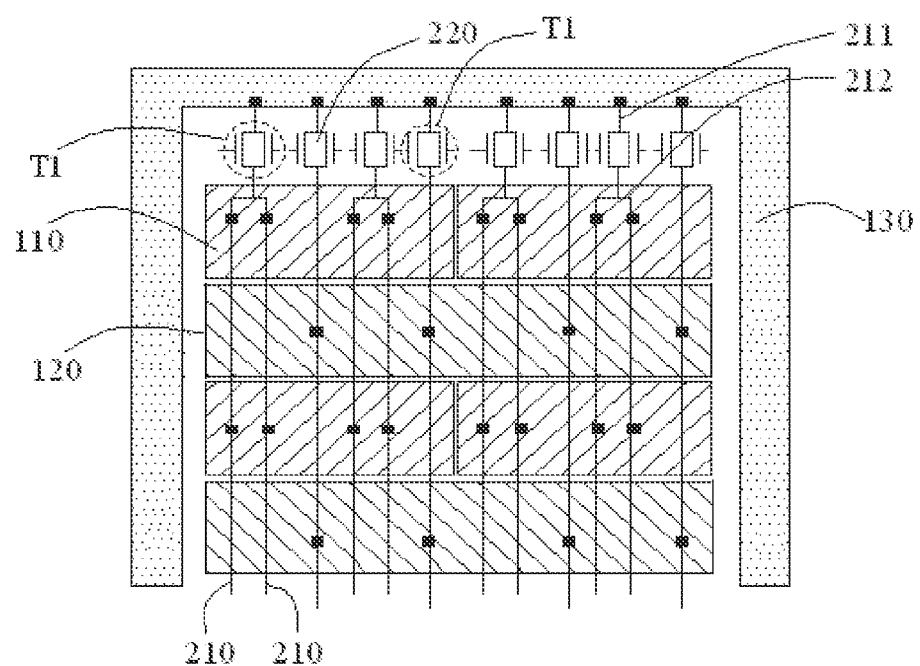
FIG. 2 is a schematic diagram of a common electrode layer in a second implementation of a touch display panel according to an embodiment of the present invention.
Figure 3:
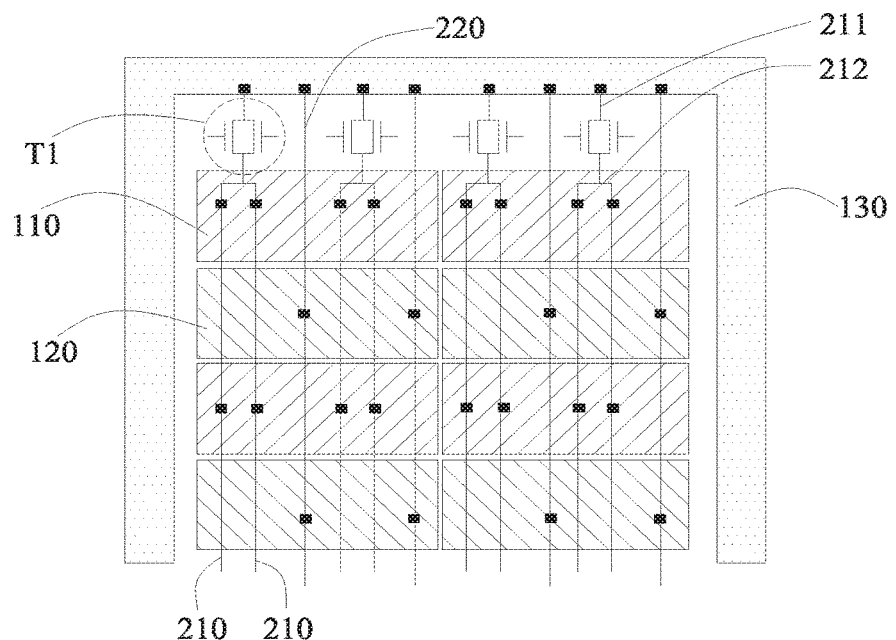
FIG. 3 is a schematic diagram of a common electrode layer in a third implementation of a touch display panel according to an embodiment of the present invention.

As one aspect of the present disclosure, there is provided a touch display panel. FIGS. 1 to 3 illustrate, by way of example, three specific implementations of the touch display panel according to embodiments of the present invention. As shown in FIG. 1, the touch display panel includes a common electrode layer which includes a first common electrode 110 and a second common electrode 120 spaced apart from each other. The touch display panel further includes a touch signal source (not shown). Each display cycle of the touch display panel includes a display stage and a touch stage, and the touch signal source can provide a touch signal to the first common electrode in the touch stage. The touch display panel further includes a switch layer and a common wire 130, the common wire 130 is connected to a common voltage output terminal (not shown), the second common electrode 120 is electrically connected to the common wire 130, and the switch layer includes a first switch element T1.

Specifically, the first switch element T1 is used for electrically connecting the first common electrode 110 with the common wire 130 in the display stage, and disconnecting the first common electrode 110 from the common wire 130 in the touch stage.

It can be easily understood that, the common voltage output terminal is used for outputting a common voltage signal.

In the touch display panel according to an embodiment of the present invention, the first common electrode 110 also serves as a touch driving electrode. Specifically, in the display stage, the first switch element T1 is turned on to electrically connect the first common electrode 110 with the common wire 130, and meanwhile, the second common electrode 120 is also connected with the common wire 130, so the common voltage signal is provided, via the common wire 130, to the first common electrode 110 and the second common electrode 120 from the common voltage output terminal; in the touch stage, the first switch element T1 is turned off to disconnect the first common electrode 110 from the common wire 130, so that the touch signal is provided to the first common electrode 110 from the touch signal source.

Because the first common electrode 110 is connected to the common electrode output terminal via the common wire 130, rather than via a touch driving circuit as in the prior art, in the display stage, the RC loading produced when connecting the first common electrode 110 and the common voltage output terminal is close to that produced when connecting the second common electrode 120 and the common voltage output terminal according to the embodiment of the present invention. It can thus be seen that more uniform display effect can be obtained when the touch display panel according to the embodiment of the present invention used to display images.

As described above, the touch display panel also includes the touch signal source, which provides the touch signal to the first common electrode 110 in the touch stage and is disconnected with the first common electrodes 110 in the display stage. To this end, the touch display panel may further include a second switch element (not shown), which is used for disconnecting the first common electrode 110 from the touch signal source in the display stage and electrically connecting the first common electrode 110 with the touch signal source in the touch stage. When the first common electrode 110 is electrically connected with the touch signal source, the touch signal can be applied to the first common electrode 110.

In the embodiment of the present invention, arrangement of the common wire 130 is not particularly limited as long as the common wire 130 can be connected with the common voltage output terminal and transfer voltage signals. Optionally, the common wire 130 is arranged in the common electrode layer, the material of the common wire 130 is the same as that of the first common electrode 110. In other words, the common wire 130 is formed at the same time when forming the first common electrode 110 and the second common electrode 120. By arranging the common wire 130 in the common electrode layer, it is conducive to simplifying the manufacturing process of the touch display panel.

It can be easily understood that, the touch display panel includes a display region and a non-display region surrounding the display region. Pixel units for displaying images are arranged in the display region, and lead wires for transferring signals are arranged in the non-display region. To prevent the common wire 130 and the first switch element T1 from influencing normal display of the touch display panel, optionally, the common wire 130 and the first switch element T1 are both arranged in the non-display region of the touch display panel.

Similarly, the second switch element may also be arranged in the non-display region of the touch display panel. For ease of arrangement, the second switch element may be arranged in the switch layer and formed at the same time when forming the first switch element.

In the embodiment of the present invention, the numbers of the first common electrode(s) 110 and the second corn electrode(s) 120 are not particularly limited. In order to improve sensitivity of touch operation, optionally, the touch display panel includes a plurality of rows of first common electrodes 110 and a plurality of rows of second common electrodes 120, and the plurality of rows of first common electrodes 110 and the plurality of rows of second common electrodes 120 are arranged alternately in a column direction, as shown in FIG. 1.

It should be understood that, a row direction and a column direction in a display panel are merely two directions perpendicular to each other, and do not constitute a limitation to the present disclosure.

In the embodiment of the present invention, specific structure of the first common electrode 110 is not particularly limited. In order to further improve sensitivity of touch operation, optionally, each row of first common electrode 110 includes a plurality of first common electrode blocks 110a, and the touch display panel further includes a plurality of first leads 210, each of which corresponds to at least one column of first common electrode blocks 110a. Each first lead 210 is used for connecting the first common electrode blocks 110a corresponding to the first lead 210 in series. A first end of the first lead 210 is connected to the common wire 130 via the first switch element T1, a second end of the first lead 210 is connected to an output terminal of the touch signal source (via the second switch element in the case where the second switch dement is included), and one first switch element T1 is used for controlling the connection between at least one first lead 210 and the common wire 130.

In order to simplify the manufacturing process, optionally, the first leads 210 are arranged in the same layer as data lines of the touch display panel.

According to one embodiment of the present invention, the number of the first switch elements T1 is the same as that of the first leads 210, that is, each first lead 210 corresponds to one first switch element T1. Further, each first lead 210 corresponds to one column of first common electrode blocks 110a.

According to another embodiment of the present invention, several first leads 210 may be connected to the same first switch element T1. As shown in FIG. 1, the touch display panel further includes a plurality of sets of connecting portions arranged in the same layer as the first leads 210, and each set of connecting portions includes a vertical connecting portion 221 and a horizontal connecting portion 212. A first end of the vertical connecting portion 211 is connected with the horizontal connecting portion 212, a second end of the vertical connecting portion 211 is electrically connected with the common wire 130, the first switch element T1 is arranged on the vertical connecting portion 211, the horizontal connecting portion 212 is connected with the first ends of several first leads 210, and different first leads 210 correspond to different columns of pixel units. For each column of pixel units, not only a data line corresponding thereto but also a first lead 210 corresponding thereto is provided, that is, the so-called "dual source" structure is formed.

The above arrangement can reduce the number of the first switch elements T1 and simplify the structure of the touch display panel. In the specific implementations shown in FIGS. 1 to 3, each horizontal connecting portion 212 is connected with two first leads 210.

According to the embodiment of the present invention, the second switch element for controlling electrical connection between the first common electrode 110 and the touch signal source may be arranged at a second end of the first lead 210, that is, for each first lead 210, the first switch element T1 and the second switch element are respectively arranged at two ends of the first lead 210.

In the above embodiment, one column of first common electrode blocks 110a are connected in series by one first lead 210 to form a touch driving electrode extending in the column direction, and the touch signal or the common voltage signal is introduced to this column of first common electrode blocks 110a via said first lead 210.

For ease of arrangement, optionally, the first leads 210 and the first common electrodes 110 are arranged in different layers, and each first lead 210 is electrically connected to the first common electrode blocks 110a corresponding thereto through first via holes.

According to the embodiment of the present invention, the touch display panel further includes a second lead 220 used for connecting the second common electrodes 120 in different rows in series. With the second common electrodes 120 in different rows connected in series, the common voltage signal can be easily provided to the second common electrodes 120.

The touch display panel according to the embodiments of the present invention may be a self-capacitance touch display panel, or a mutual capacitance touch display panel.

In order to further reduce the difference between the RC loadings of a first common electrode 110 and a second common electrode 120, optionally, the second lead 220 is electrically connected to the common wire 130. Optionally, the first lead 210 and the second lead 220 are arranged in the same layer. The second lead 220 may be electrically connected to the common wire 130 and the second common electrodes 120 through a plurality of second via holes, respectively.

As a preferred implementation of the present invention, as shown in FIG. 2, the first switch element T1 is also provided between the second lead 220 and the common wire 130. Like the first switch element T1 connecting the first lead 210 and the common wire 130, the first switch element T1 connecting the second lead 220 and the common wire 130 is also turned on in the display stage and turned off in the touch stage. in this case, the second common electrodes 120 may serve as touch sensing electrodes, and the first common electrodes 110 serve as the touch driving electrodes.

The touch signal source may include a touch driving signal source, which is connected to the first lead 210 via the second switch element, and a touch sensing signal source, which is connected to the second lead 220 via a third switch element. It can be easily understood that, the third switch element is turned on in the touch stage and turned off in the display stage. Specifically, in the display stage, the second switch element and the third switch element are turned off, the first switch element T1 is turned on, and thus the common voltage signal is applied to both the first common electrode 110 and the second common electrode 120. In the touch stage, the second switch element and the third switch element are turned on, the first switch element T1 is turned off, thus the touch driving signal is applied to the first common electrode 110 and the touch sensing signal is applied to the second common electrode 120. In the touch stage, a capacitor is formed between the first common electrode 110 and the second common electrode 120. When a finger of an operator contacts the touch display panel, a sensing signal on the second common electrode 120 will be changed, and coordinates of the touch point can be determined based on the change in the sensing signal. For ease of arrangement, for each second lead 220, the first switch element T1 and the third switch element are arranged on two ends of the second lead 220, respectively.

In the embodiments of the present invention, specific types of the first switch element, the second switch element and the third switch element are not particularly limited, as long as they can be turned on or turned off accordingly in the display stage and the touch stage. For example, the first switch element, the second switch element and the third switch element may all be TFTs. In order to enhance control sensitivity, optionally, as shown in FIGS. 1 to 3, the first switch element T1 may be a transmission gate including a NMOS tube and a PMOS tube. Accordingly, the touch display panel further includes control gate lines (not shown), which are connected to gates of the NMOS tube and the PMOS tube so that control signals for controlling on and off states of the first switch element T1 are provided via the control gate lines.

In the embodiments of the present invention, specific shape of the second common electrode 120 is not particularly limited. In the specific implementations shown in FIGS. 1 and 2, the second common electrode 120 is strip-shaped. In the specific implementation shown in FIG. 3, the second common electrode 120 is block-shaped.

In the embodiments of the present invention, in addition to the case where the second common electrode 120 also serves as the touch sensing electrode, the touch display panel may further be provided therein with a separate touch sensing electrode. That is to say, the touch display panel may further include a touch sensing electrode, which is spaced apart and insulated from the common electrode layer. Accordingly, the touch signal source includes a touch driving signal source, which is connected to the first lead 210 via the second switch element, and a touch sensing signal source, which is connected to the touch sensing electrode.

According to the embodiment of the present invention, the touch display panel may include an array substrate, a color filter substrate and a liquid crystal layer arranged between the array substrate and the color filter substrate, the common electrode layer is arranged on the array substrate, and the touch sensing electrode is arranged on the color filter substrate.

In order to enhance the display effect, generally, a black matrix is arranged on the color filter substrate. In order to improve the aperture ratio of the touch display panel, optionally, the touch sensing electrode is overlapped with the black matrix.

As another aspect of the present disclosure, there is provided a method for driving the above touch display panel according to the embodiments of the present invention, wherein, each display cycle of the touch display panel includes a touch stage and a display stage, and the method includes steps of:

controlling the first switch element to be turned on to electrically connect the first common electrode with the common wire, in the display stage; and controlling the first switch element to be turned off to disconnect the first common electrode from the common wire, in the touch stage.

In the case where the touch display panel includes the second switch element for controlling electrical connection between the first common electrode and the touch signal source, the method may further include steps of:

controlling the second switch element to be turned off to disconnect the first common electrode from the touch signal source, in the display stage; and controlling the second switch element to be turned on to electrically connect the first common electrode with the touch signal source, in the touch stage.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as failing within the protection scope of the present invention.

The invention claimed is:

1. A touch display panel, comprising a common electrode layer, which comprises a first common electrode and a second common electrode spaced apart from each other, wherein, the touch display panel further comprises a touch signal source, each display cycle of the touch display panel comprises a display stage and a touch stage, the touch signal source is capable of providing a touch signal to the first common electrode in the touch stage, the touch display panel further comprises a switch layer and a common wire, the common wire is connected to a common voltage output terminal, the second common electrode is electrically connected to the common wire, and the switch layer comprises a first switch element, which is used for electrically connecting the first common electrode with the common wire in the display stage, and disconnecting the first common electrode from the common wire in the touch stage.

2. The touch display panel according to claim 1, wherein, the common wire is arranged in the common electrode layer, and the common wire and the first common electrode are made of the same material.

3. The touch display panel according to claim 1, wherein, the common wire and the first switch element are both arranged in a non-display region of the touch display panel.

4. The touch display panel according to claim 1, wherein, the touch display panel comprises a plurality of rows of first common electrodes and a plurality of rows of second common electrodes, and the plurality of rows of first common electrodes and the plurality of rows of second common electrodes are arranged alternately in a column direction.

5. The touch display panel according to claim 4, wherein, each row of first common electrode comprises a plurality of first common electrode blocks, the touch display panel further comprises a plurality of first leads, each of which corresponds to at least one column of first common electrode blocks and is used for connecting the first common electrode blocks corresponding thereto in series, a first end of each first lead is connected to the common wire via the first switch element, a second end of the first lead is connected to an output terminal of the touch signal source, and one first switch element is used for controlling connection between at least one first lead and the common wire.

6. The touch display panel according to claim 5, wherein, the first leads and the common electrode layer are arranged in different layers, and each first lead is electrically connected to the first common electrode blocks corresponding thereto through first via holes.

7. The touch display panel according to claim 5, further comprising a second lead used for connecting the second common electrodes in different rows in series.

8. The touch display panel according to claim 7, wherein, the second lead is electrically connected to the common wire, the first lead and the second lead are arranged in the same layer, the second lead and the common electrode layer are arranged in different layers, and the second lead is electrically connected to the common wire and the second common electrodes through a plurality of second via holes, respectively.

9. The touch display panel according to claim 7, wherein, a first switch element is provided between the second lead and the common wire, and is used for electrically connecting the second common electrodes with the common wire in the display stage, and disconnecting the second common electrodes from the common wire in the touch stage.

10. The touch display panel according to claim 7, wherein, the touch signal source comprises a touch driving signal source, which is connected to the first lead via a second switch element, and a touch sensing signal source, which is connected to the second lead via a third switch element.

11. The touch display panel according to claim 5, wherein, the first leads and data lines of the touch display panel are arranged in the same layer.

12. The touch display panel according to claim 5, further comprising a plurality of sets of connecting portions arranged in the same layer as the first leads, each set of connecting portions comprises a vertical connecting portion and a horizontal connecting portion, a first end of the vertical connecting portion is connected with the horizontal connecting portion, a second end of the vertical connecting portion is electrically connected with the common wire, the first switch element is arranged on the vertical connecting portion, the horizontal connecting portion is connected with the first ends of two or more first leads, and different first leads correspond to different columns of pixel units.

13. The touch display panel according to claim 1, wherein, the first switch element is a transmission gate comprising a NMOS tube and a PMOS tube, and the touch display panel further comprises control gate lines, which are connected to gates of the NMOS tube and the PMOS tube so that control signals for controlling on and off states of the first switch element are provided via the control gate lines.

14. The touch display panel according to claim 1, wherein, the second common electrode is strip-shaped or block-shaped.

15. The touch display panel according to claim 14, wherein, the second switch element is arranged in the switch layer, and is formed at the same time when forming the first switch element.

16. The touch display panel according to claim 1, further comprising a second switch element, which is used for disconnecting the first common electrode from the touch signal source in the display stage and electrically connecting the first common electrode with the touch signal source in the touch stage.

17. The touch display panel according to claim 1, further comprising a touch sensing electrode spaced apart and insulated from the common electrode layer, wherein the touch signal source comprises a touch driving signal source, which is connected to the first common electrode, and a touch sensing signal source, which is connected to the touch sensing electrode.

18. The touch display panel according to claim 17, wherein, the touch display panel comprises an array substrate, a color filter substrate and a liquid crystal layer arranged between the array substrate and the color filter substrate, the common electrode layer is arranged on the array substrate, the touch sensing electrode is arranged on the color filter substrate, a black matrix is arranged on the color filter substrate, and the touch sensing electrode is overlapped with the black matrix.

19. A method for driving the touch display panel according to claim 1, wherein, the method comprises steps of:
controlling the first switch element to be turned on to electrically connect the first common electrode with the common wire, in the display stage; and
controlling the first switch element to be turned off to disconnect the first common electrode from the common wire, in the touch stage.

20. The method according to claim 19, wherein, the touch display panel further comprises a second switch element used for disconnecting the first common electrode from the touch signal source in the display stage and electrically connecting the first common electrode with the touch signal source in the touch stage, and the method further comprises steps of:

controlling the second switch element to be turned off to disconnect the first common electrode from the touch signal source, in the display stage; and controlling the second switch element to be turned on to electrically connect the first common electrode with the touch signal source, in the touch stage.

* * * * *